H. G. SAAL.
SHAFT BEARING.
APPLICATION FILED JUNE 21, 1917.
1,269,750.
Patented June 18, 1918.
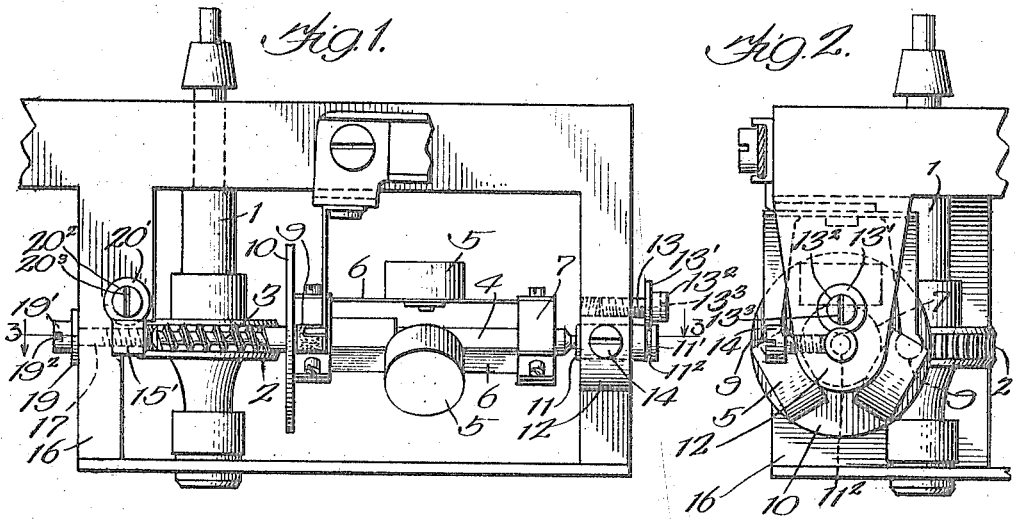
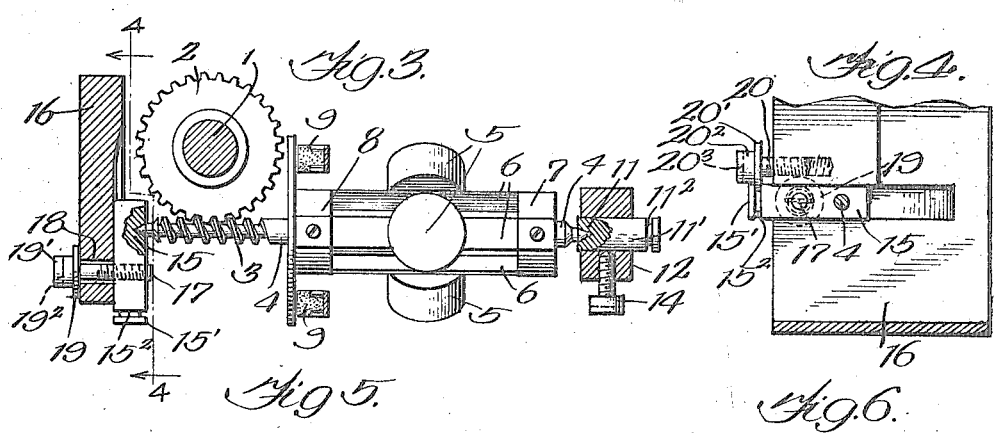
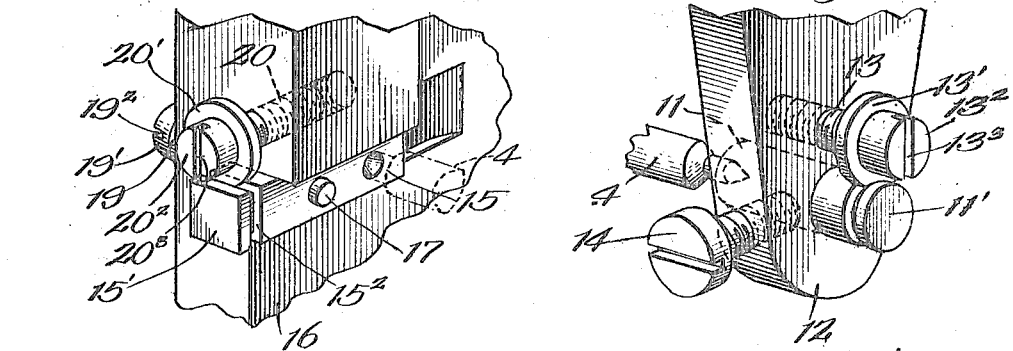
Inventor:
Henry G. Saal.

UNITED STATES PATENT OFFICE.

HENRY G. SAAL, OF CHICAGO, ILLINOIS.

SHAFT-BEARING.

1,269,750.　　　　　Specification of Letters Patent.　　Patented June 18, 1918.

Application filed June 21, 1917. Serial No. 176,004.

*To all whom it may concern:*

Be it known that I, HENRY G. SAAL, citizen of the United States, residing at Chicago, in the county of Cook and State of Illinois, have invented a certain new and useful Improvement in Shaft-Bearings, of which the following is a full, clear, concise, and exact description.

My invention relates to bearings for rotatable shafts and has for its object the provision of means for adjusting one of the bearings of a shaft transversely of the shaft. In practising my invention I employ a support for the rotatable bearing on which the bearing is movable transversely of the shaft and bearing adjusting means in connection with the bearing support upon one side of the bearing and movable transversely of the shaft, this means in both directions of its movement having thrusting engagement with the bearing to adjust it on the bearing support transversely of the shaft.

My invention is of particular service where the bearing to be adjusted is an end thrust bearing that engages an end of the shaft to receive end thrusts of the shaft. The mechanism which is employed for adjusting this end thrust bearing desirably includes a rotatable screw substantially parallel with and disposed by the side of the bearing and in threaded connection with the bearing support and two elements movable transversely of the shaft, one of these elements being a transversely grooved member preferably in union with the bearing and the other a head preferably in union with the screw and received in the transverse groove in the grooved member to have thrusting engagement with said grooved member when moving in either direction transversely of the shaft whereby the bearing is moved transversely of the shaft upon rotation of the adjusting screw.

I will explain my invention more fully by reference to the accompanying drawing showing the preferred embodiment thereof as employed in connection with the governor for controlling the speed of a turn table supporting shaft in a phonograph structure. In the drawing Figure 1 is a plan view in part illustrating a governor that employs a governor shaft having a bearing which is adjustable in accordance with my invention; Fig. 2 is an end view of the governor shown in Fig. 1; Fig. 3 is a view on line 3—3 of Fig. 1; Fig. 4 is a view on line 4—4 of Fig. 3; Fig. 5 is a perspective view illustrating the bearing structure of Fig. 4; and Fig. 6 is a perspective view illustrating the bearing structure shown in Fig. 2.

Like parts are indicated by similar characters of reference throughout the different figures.

The bearing structure shown in Figs. 4 and 5 forms the subject matter of my present application while the bearing structure shown in Figs. 2 and 6, which is preferably employed in conjunction with the bearing structure shown in Figs. 4 and 5, forms the subject matter of my copending application Serial No. 176,003, filed June 21, 1917.

The governor illustrated is shown as being associated with a shaft 1 that is adapted for the operation of a turn table for supporting a disk phonographic record, this shaft supporting a worm wheel 2 engageable by a worm 3 provided upon the governor shaft 4. In accordance with common practice the shaft 1 is driven by a spring motor through gearing which is not illustrated, the gear wheel 2 being added in order that the shaft 1 may drive the worm 3 to rotate the governor shaft 4 for the purpose of operating the centrifugal governor 5 to maintain the speed of the turn table substantially constant. This centrifugal governor is of a common form, the weights thereof being mounted upon intermediate portions of the resilient strips 6. Each of these resilient strips is mounted at one end upon a sleeve 7 rigidly secured to the shaft 4, the other end of the resilient strip being connected with a collar 8 that is movable along the shaft 4 and with respect to the brake pads 9. The collar 8 is in fixed relation to a brake disk 10 which engages the pads 9 when the governor shaft 4 reaches a pretermined speed whereby the speed of the turn table shaft 1 is controlled.

The end thrust bearing 11 engages one end of the shaft 4 to receive end thrusts of this shaft. This end thrust bearing 11 is received in an opening provided through the bearing support 12, the bearing being movable on its support longitudinally of the shaft. A rotatable screw 13 is substantially parallel with and is disposed by the side of the bearing 11. This screw 13 is in threaded connection with the bearing support and operates means for adjusting the bearing 11 on the support longitudinally of the shaft. As shown, the adjusting means comprises two elements movable longitudinally of the shaft. One of these elements is a grooved member 11¹ that is caused to be in union with the bearing 11 preferably by being integrally formed therewith. This member 11¹ is transversely grooved as indicated at 11², this transverse groove being preferably annular. The other one of these elements is in the nature of a head 13¹ that projects into the transverse groove 11² and is in union with the screw 13 preferably by being integrally formed therewith. The head 13¹ desirably has a continuation 13² provided with a screw driver slot 13³ whereby the screw 13 may be turned. As the screw 13 is turned the groove engaging head 13¹ thereof moves longitudinally of the shaft and causes the bearing 11 to move longitudinally of the shaft 4, the set screw 14 being loose during the bearing adjusting movement. After the desired adjustment of the bearing 11 has been secured by the rotation of the screw 13, the set screw 14, which is in threaded engagement with the bearing support 12, is brought into holding engagement with the bearing 11 to maintain the adjustment thereof which has been effected by the screw 13.

The end thrust bearing 15 engages the other end of the shaft 4 and is mounted upon a support 16 in a manner to permit it to be moved transversely of the shaft 4. The bearing 15 carries a rotatable clamping screw 17 that extends longitudinally of the shaft 4, the screw 17 passing loosely through an opening 18 in the bearing support 16, said opening being sufficiently large to permit the bearing 15 to be moved within a desired range upon the support 16. The clamping screw 17 is in threaded engagement with the bearing 15, the head 19 of the clamping screw 17 having clamping engagement with the bearing support to maintain the bearing 15 in the position to which it is adjusted. By this arrangement the position of the worm 13 with respect to the worm wheel 2 may be adjusted to secure desired meshing between said worm and worm wheel. The head 19 desirably has a continuation 19¹ provided with a screw driver slot 19² whereby the screw 17 may be turned to effect clamping engagement between the screw structure and the bearing support 16 to hold the bearing 15 in selected relation with the bearing support. Another rotatable screw 20 is in threaded engagement with the bearing support and is disposed transversely of the shaft 4. This screw operates means for adjusting the bearing 15 transversely of the shaft 4 which means comprises two elements movable transversely of the shaft 4. One of these elements is a transversely grooved member 15¹ that is caused to be in union with the bearing 15 preferably by being integrally formed therewith. This member 15¹ is transversely grooved as indicated at 15². The other one of these elements is in the nature of a head 20¹ that projects into the transverse groove 15² of the grooved member 15¹ and is in union with the screw 20 preferably by being integrally formed therewith. The head 20¹ desirably has a continuation 20² provided with a screw driver slot 20³ whereby the screw 20 may be turned. As the screw 20 is turned the groove engaging head 20¹ thereof is moved transversely of the shaft 4 and longitudinally of the bearing 15 to cause the bearing 15 to move transversely of the shaft 4, the set screw 17 being loose with respect to the bearing support 16 during the adjusting movement of the bearing 15. After the desired adjustment of the bearing 15 has been secured the set screw 17 is tightened by turning it to bring its head 19 into clamping engagement with the bearing support 16.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a rotatable shaft; of an end thrust bearing engaging an end of the shaft to receive end thrusts of the shaft; a support for the bearing; a rotatable clamping screw extending longitudinally of the shaft and carried by and in threaded engagement with the bearing, this clamping screw being movable with the bearing with respect to the bearing support with which support the clamping screw has clamping engagement to hold the bearing in selected position; another rotatable screw in threaded engagement with the bearing support and disposed transversely of the shaft; and means for adjusting said bearing on said bearing support transversely of the shaft, this adjusting means comprising two elements movable transversely of the shaft one a transversely grooved member and the other a head received in the transverse groove of the grooved member to have thrusting engagement with said grooved member when moving in either direction transversely of the shaft, one of these elements being in union with the adjusting screw to move therewith transversely of the shaft and the other in union with the bearing whereby the bearing is movable transversely of the shaft upon rotation of the screw.

2. The combination with a rotatable shaft; of an end thrust bearing engaging an end of the shaft to receive end thrusts of the shaft; a support for the bearing; a rotatable screw in threaded engagement with the bearing support and disposed transversely to the shaft; and means for adjusting said bearing on said bearing support transversely of the shaft, this adjusting means comprising two elements movable transversely of the shaft, one a transversely grooved member and the other a head received in the groove of the grooved member to have thrusting engagement with said grooved member when moving in either direction transversely of the shaft, one of these elements being in union with the adjusting screw to move therewith transversely of the shaft and the other in union with the bearing whereby the bearing is movable transversely of the shaft upon rotation of the screw.

3. The combination with a rotatable shaft; of a bearing engaging an end of the shaft; a support for the bearing; a rotatable clamping screw extending longitudinally of the shaft and carried by and in threaded engagement with the bearing, this clamping screw being movable with the bearing with respect to the bearing support with which support the clamping screw has clamping engagement to hold the bearing in selected position; another rotatable screw in threaded engagement with the bearing support and disposed transversely to the shaft; and means for adjusting said bearing on said bearing support transversely of the shaft, this adjusting means comprising two elements movable transversely of the shaft one a transversely grooved member and the other a head received in the groove of the grooved member to have thrusting engagement with said grooved member when moving in either direction transversely of the shaft, one of these elements being in union with the adjusting screw to move therewith transversely of the shaft and the other in union with the bearing whereby the bearing is movable transversely of the shaft upon rotation of the screw.

In witness whereof, I hereunto subscribe my name this twentieth day of April, A. D. 1917.

HENRY G. SAAL.

Copies of this patent may be obtained for five cents each, by addressing the "Commissioner of Patents, Washington, D. C."